United States Patent [19]

Lee

[11] Patent Number: 5,217,812
[45] Date of Patent: Jun. 8, 1993

[54] EXTRUDABLE AND PRIMERLESS ADHESIVES AND PRODUCTS THEREFROM

[75] Inventor: I-Hwa Lee, Wilmington, Del.

[73] Assignee: E. I. Du Pont de Nemours and Company, Wilmington, Del.

[21] Appl. No.: 550,102

[22] Filed: Jun. 25, 1990

[51] Int. Cl.$^5$ .............................................. B32B 15/08
[52] U.S. Cl. .................... 428/461; 428/516; 428/520; 428/523; 524/270; 524/272; 524/274
[58] Field of Search ............... 428/516, 461, 520, 523; 525/1, 72, 74, 78, 80; 524/270, 272, 274

[56] References Cited

U.S. PATENT DOCUMENTS

| | | | |
|---|---|---|---|
| 4,337,298 | 6/1982 | Karim et al. | 428/461 |
| 4,358,557 | 11/1982 | Boggs | 524/272 |
| 4,367,113 | 1/1983 | Karim et al. | 524/187 X |
| 4,602,036 | 9/1986 | Waniczek et al. | 524/272 |
| 4,640,870 | 3/1989 | Akazawa et al. | 428/483 |
| 4,861,676 | 8/1989 | Lee | 428/516 |
| 4,861,677 | 8/1989 | Lee | 428/516 |

FOREIGN PATENT DOCUMENTS 53-18653 2/1978 Japan.

OTHER PUBLICATIONS

Derwent Ab. 85-107763/18-Jap. J60051768 Mar. 1985.
Derwent Ab. 89-079561/11-Jap. J01027923 Jan. 1989.
Derwent Ab. 83-40540K/17-Jap. 5847038 Mar. 1983.
Hert et al. "Reactive Olefinic Copolymers" P154-1-1-120 pub. 1987.
Jones et al. "Modified Thermoplastic Polymers" Tappi Journal, 1989 177-180 pub. Dec. 1989.
Research Disclosure Journal 313103, p. 435, Apparent Publication Date May 10, 1990.
Derwent AB 85-102054/17-Jap 60-047053 Mar. 14, 1985.
Derwent AB 90-189767/25-Jap 02-124955 May 14, 1990.
Research Disclosure Journal article 214,943-313103, pp. 433-439.

*Primary Examiner*—Paul J. Thibodeau
*Assistant Examiner*—Hoa T. Le

[57] ABSTRACT

An extrudable bonding resin composition of (a) 65 to 99 percent of an ethylene copolymer portion of a copolymer of ethylene and 20 to 50 percent comonomer of acids, esters, and the like, and grafted sidechains of comonomer units selected from carboxylic acid, anhydride, salt, or half ester functionality, and optionally a compatible non-grafted ethylene copolymer, and (b) 1 to 35 percent by weight of a tackifying resin exhibits good adhesion properties without the need for a primer.

28 Claims, No Drawings

EXTRUDABLE AND PRIMERLESS ADHESIVES AND PRODUCTS THEREFROM

BACKGROUND OF THE INVENTION

This invention relates to an extrudable adhesive composition of ethylene copolymer and tackifying resin, useful for bonding structural polymers to barrier polymers.

Many attempts have been made to provide adhesive compositions which are particularly suitable for joining together layers of polymers, especially for joining structural polymers to polymers such as barrier resins. For example, Japanese Application 53 18653 discloses an adhesive resin for low temperature heat sealing purposes comprising 3 to 100 parts by weight of a hydrogenated petroleum resin, and 100 parts by weight of an ethylene carboxylate-vinyl acetate copolymer obtained by copolymerizing an unsaturated carboxylic acid and/or anhydride with at least one vinylidene monomer in the presence of an ethylene-vinyl acetate copolymer.

Japanese application 60 51768 discloses a hot melt adhesive composition of 100 parts by weight of polymer component, 25 to 200 parts by weight of tackifier resin, and 75 parts by weight or less of wax. The polymer component comprises 25 to 75 weight % low crystallinity or amorphous ethylene alpha-olefin copolymer (20 to 50 mole % ethylene, 50 to 80 mole % alpha-olefin) and 25 to 75 weight % ethylene vinyl ester copolymer. Either polymer, or both, are modified with unsaturated carboxylic acid or its acid anhydride. The tackifier resin is a terpene resin or petroleum resin. The wax is a paraffin, microcrystalline polyethylene, etc. The composition has a viscosity of 50 Pa.sec or less at 180° C.

Japanese Application 01 27923 discloses a laminate in which a resin layer is coextrusion laminated onto an oriented film or Al foil. The adhesive is made of 50 to 99 weight percent ethylene-alpha-olefin random copolymer partially graft-modified with acid, and 1 to 50 weight percent tackifier. The ethylene-alpha-olefin copolymer has a density of 0.850 to 0.900 g/cc.

U.S. Pat. No. 4,670,349 discloses an adhesive resin composition comprising 100 parts of an ethylene/vinyl acetate or ethylene/alpha-olefin random copolymer, 1-50 parts of modified polyethylene containing 0.01 to 10% grafted acid or derivative, and 1-125 parts hydrogenated aromatic petroleum resin. The resin composition is useful as an adhesive for polystyrene and ethylene vinyl alcohol copolymer.

U.S. Pat. No. 4,337,297 discloses blends of a low density ethylene polymer and a copolymer of 70-90 % ethylene with the balance acrylic or methacrylic acid or vinyl acetate, the two ethylene polymers comprising together 100 parts; an ionomer resin having an acid content of 1-10%, 2-100 parts; and optionally a tackifying resin, 0-150 parts. The blend is a useful adhesive for PET film.

U.S. Pat. No. 4,367,113, Karim et al. discloses a similar blend except the low density polymer is replaced by an ethylene-alpha olefin copolymer or isotactic propylene polymer.

U.S. Pat. No. 4,358,557 discloses a hot-melt adhesive comprising ethylene vinyl acetate copolymer, a tackifier resin selected from hydrocarbon resin, polyterpene resin or rosin ester, a paraffin wax and an aromatic hydrocarbon resin.

U.S. Pat. No. 4,861,676 discloses a blend of ethylene copolymer, ethylene copolymer modified by grafting with a comonomer containing pendant acid or acid derivative functionality, styrene polymer, and alicyclic resin modifier or stabilized rosin ester. The composition provides a useful adhesive, particularly for bonding polystyrene to barrier polymers.

U.S. Pat. No. 4,861,677 discloses a blend of ethylene vinyl acetate copolymer, ethylene vinyl acetate copolymer modified by grafting with a comonomer containing pendant acid or acid derivative functionality, and impact-modified polystyrene. The composition provides a useful adhesive, particularly for bonding polystyrene to gas barrier polymers.

SUMMARY OF THE INVENTION

The present invention provides an extrudable bonding resin composition consisting essentially of:

(a) about 65 to about 99 percent by weight of an ethylene copolymer portion consisting essentially of
  (i) about 1 to 100 percent by weight of a copolymer of about 50 to about 80 weight percent ethylene and 20 to about 50 weight percent of at least one comonomer copolymerized therewith selected from the group consisting of unsaturated mono- or dicarboxylic acids of 2-20 carbon atoms, esters or salts of said unsaturated mono- or dicarboxylic acids, vinyl esters of saturated carboxylic acids where the acid group has 1-18 carbon atoms, and carbon monoxide, the carbon monoxide being present in an amount of 0 to about 30 weight percent; having grafted thereon side chains at least one comonomer unit in length, the comonomer units in said side chains being selected from the group consisting of ethylenically unsaturated mono-, di-, or polycarboxylic acids, ethylenically unsaturated carboxylic acid anhydrides, metal salts and half-esters of such acids and anhydrides, and mixtures thereof, wherein the amount of said grafted comonomer units comprises about 0.03 to about 10 percent by weight of the total bonding resin composition, and
  (ii) 0 to about 99 percent by weight of at least one copolymer of about 50 to about 80 weight percent ethylene and 20 to about 50 weight percent of at least one comonomer copolymerized therewith selected from the group consisting of unsaturated mono- or dicarboxylic acids of 2-20 carbon atoms, esters or salts of said unsaturated mono- or dicarboxylic acids, vinyl esters of saturated carboxylic acids where the acid group has 1-18 carbon atoms, and carbon monoxide, the carbon monoxide being present in an amount of 0 to about 30 weight percent,
  wherein the copolymer of (i) and each copolymer of (ii) contain at least one said copolymerized comonomer in common, the amount of each such common comonomer in each copolymer of (ii) being within about 10% of the amount of the corresponding comonomer in copolymer (i), and the total amount of said copolymerized comonomers other than such common comonomers in any such copolymer being less than about 10%; and (b) about 1 to about 35 percent by weight of a tackifying resin.

The invention further provides a multiple layer structure comprising at least one structural layer, at least one barrier layer, and at least one bonding layer of the above extrudable bonding resin composition.

DETAILED DESCRIPTION OF THE INVENTION

The extrudable bonding resin of the present invention comprises a blend of about 65 to about 99 percent by weight, preferably about 80 to about 95 percent by weight, of an ethylene copolymer component, and about 1 to about 35 weight percent of a tackifying resin. The ethylene copolymer component comprises an ethylene copolymer grafted with pendant acid or certain acid derivative functionality. This grafted copolymer may be blended, if desired, with additional ungrafted ethylene copolymer. Such blending may be desirable in order to minimize the amount of the relatively more expensive grafted material, while maintaining the excellent adhesive properties of the composition.

The grafted ethylene copolymer is present in amounts of about 1 to about 100, and preferably about 5 to about 50 percent by weight of the ethylene copolymer portion of the composition. This component is a copolymer containing about 20 to about 50, and preferably about 25 to about 30 weight percent copolymerized comonomer selected from the group consisting of unsaturated mono- or dicarboxylic acids of 2–20 carbon atoms, esters or salts of said unsaturated mono- or dicarboxylic acids, vinyl esters of saturated carboxylic acids where the acid group has 1–18 carbon atoms, and carbon monoxide, the carbon monoxide being present in an amount of 0 to about 30 weight percent. (The amount of carbon monoxide is limited only because it is believed that preparation of polymers containing more than about 30 weight percent carbon monoxide is not feasible due to problems of reactor fouling.) Vinyl acetate is a preferred comonomer, but methyl acrylate, n-butyl acrylate, and the like, optionally with carbon monoxide present as a third monomer, are also quite suitable. The balance of the copolymer is substantially copolymerized ethylene. Such copolymers are prepared by the well-known addition polymerization processes. Onto this copolymer are grafted additional comonomer units of carboxylic acid or certain carboxylic acid derivative functionality to form short sidechains. (It is believed that when maleic anhydride is the graft comonomer, the sidechains are only one or at most two monomer units long.) The melt index of the resulting graft copolymer, as measured by ASTM D1238 Condition "E", should be about 0.5 to about 40. Outside of these ranges, processing becomes more difficult, and flow instabilities may result.

The grafting monomer is selected from the group consisting of ethylenically unsaturated mono-, di-, or polycarboxylic acids, ethylenically unsaturated carboxylic acid anhydrides, and metal salts and half-esters of such acids and anhydrides. Examples of the acids and anhydrides include acrylic acid, methacrylic acid, maleic acid, fumaric acid, itaconic acid, crotonic acid, itaconic anhydride, maleic anhydride, and dimethyl maleic anhydride, and salts and half-esters thereof. Among the acids and anhydrides that are particularly useful are maleic anhydride and maleic acid.

The method for grafting of the comonomer onto the ethylene copolymer can be any of the processes which are well known in the art. For example, grafting can be carried out in the melt without a solvent, as disclosed in European Patent Application 0 266 994, incorporated herein by reference, or in solution or dispersion. Melt grafting can be done using a heated extruder, a Brabender TM or Banbury TM mixer or other internal mixers or kneading machines, roll mills, and the like. The grafting may be carried out in the presence of a radical initiator such as a suitable organic peroxide, organic perester, or organic hydroperoxide. The graft copolymers are recovered by any method which separates or utilizes the graft polymer that is formed. Thus the graft copolymer can be recovered in the form of precipitated fluff, pellets, powders, and the like.

The amount of monomer grafted onto the ethylene copolymer is not particularly limiting, and may be as low as about 0.03 weight percent or as much as about 5 percent or even 10 percent, based on the weight of the grafted ethylene copolymer. The total amount of graft polymer in the total adhesive composition, however, is important, and should be between about 0.03 and about 10 weight percent of the total composition, in order to obtain superior adhesive and bonding properties.

The ungrafted ethylene copolymer component comprises at least one comonomer similar to that described above, but without the grafted comonomer. In order to achieve good peel strength in laminates prepared from the present adhesive, the comonomer of the ungrafted copolymer should be of a type and amount sufficiently similar to that of the grafted copolymer that the grafted and ungrafted copolymers have a suitable degree of compatibility. Such copolymers are normally compatible if they contain the same or closely chemically related monomers (except for the graft comonomer) and the amounts of such monomers in the two copolymers are similar. Specifically, the grafted copolymer and each of the ungrafted copolymers (if there is more than one) should contain at least one said copolymerized comonomer in common and the amount of each such common comonomer in the grafted copolymer and the ungrafted copolymer should be within about 10%, and preferably within about 5%, of each other. Thus if the grafted copolymer is based on an ethylene polymer containing 30 weight % n-butyl acrylate, the ungrafted copolymer should contain between about 20 and about 40 weight percent n-butyl acrylate. Small amounts of additional comonomers may also be present in one or both copolymers, but in order to retain compatibility each copolymer should contain less than about 10% by weight of such comonomers that are not common to the other copolymer. Alternatively, closely similar comonomers, such as n-butyl acrylate and i-butyl acrylate could be interchanged while retaining compatibility. It is preferred that the graft copolymer be the same as the ungrafted copolymer, except for the presence of the grafted monomers. The melt index of the ungrafted copolymer should be about 0.05 to about 40.

The ungrafted copolymer component can be a single polymer or it can be more than one polymer, provided that the comonomer content of each such polymer is as described above, i.e., the polymers are mutually compatible. It has been sometimes found to be desirable that the ungrafted copolymer component be a mixture of two polymers having identical comonomer contents but having differing melt indices. For example, one copolymer can have a melt index of about 6 and a second can have a melt index of 25 or higher. The mixture of these polymers should have an overall melt index within the range of about 0.05 to about 40, as indicated. Use of such a mixture of copolymers provides ease in processability in, for example extrusion coating.

It is similarly to be understood that the use of more than one graft copolymer will fall within the scope of the present invention, provided that the general principles of polymeric compatibility set forth herein are maintained.

The second major component of the present invention is a tackifying resin, which is present at about 1 to about 35 weight percent, preferably about 5 to about 20 weight percent of the composition. Suitable tackifying resins may be selected from the categories of:
(i) alicyclic or aliphatic hydrocarbon resins;
(ii) aromatic hydrocarbon resins;
(iii) rosin and rosin derivatives; and
(iv) terpene resins, or mixtures thereof. These tackifying resins will generally have a ring-and-ball softening temperature (ASTM E-2858T) of 0° to 150° C., preferably about 75° to about 140° C.

The tackifying resins employed in the present invention are well known products available from commercial sources. Rosin tackifiers are described in the Kirk Othmer *Encyclopedia of Chemical Technology*, Interscience Publishers, Second Edition, Volume 17, pages 475–509. They include naturally occurring rosins and chemically modified rosin derivatives obtained by hydrogenation, dehydrogenation, isomerization, and the like. Rosin derivatives includes rosin esters and rosin acids. Rosin acids are typically derived from tall oil and can be mixtures of so called abietic types and primary types. Rosin esters are formed by esterifying rosin acid with a di-, tri-, or tetra-hydroxy alphatic alcohol such as ethylene glycol, propylene glycol, glycerine, or pentaerythritol. The terpene resins are generally prepared by the polymerization of terpene hydrocarbons in the presence of Friedel-Crafts catalysts at moderately low temperatures. Petroleum resins, under which are classed aliphatic, alicyclic, and aromatic hydrocarbon resins, are described in the Kirk Othmer *Encyclopedia of Chemical Technology*, Interscience Publishers, Third Edition, Volume 12, page 852. They are generally prepared by polymerization of 4-10 carbon atom hydrocarbons by selected Friedel Crafts catalysts. Higher or lower hydrocarbons may also be present. The product may be further partially or fully hydrogenated. Suitable aromatic resins can be prepared from polymerization of alpha methyl styrene, vinyl toluene, and/or indene monomers.

In addition to the above mentioned components, the adhesive resin may contain small amounts of other materials commonly used and known in the art, such as antioxidants, stabilizers, slip additives, and fillers. The adhesive resin composition is prepared by blending the above described components by any suitable means, such as melt blending, extruding, etc. Further details are provided in the Examples which follow.

The composition of the present invention provides excellent adhesion to polyester and copolyester resins, vinyl chloride polymers, polycarbonates, polyethylenes, ethylene copolymers, ionomers, polystyrene, ethylene vinyl alcohol copolymer, polyamides, and the like. It also shows good adhesion to substrates such as aluminum foil. The adhesive is particularly useful for extrusion or coextrusion laminating structural and barrier polymers on to substrates such as polyester film, including multiple layer structures comprising at least two structural layers and at least one barrier layer. The structural layers may be of the same material or can be of different materials, e.g. one layer polyester and a second layer ionomer or acid copolymer. The adhesive can be used without having to resort to use of a solvent-based primer to prepare the polymer film surface. The resulting composite structures are useful in packaging and other applications.

EXAMPLES

Adhesive blends for the Examples shown in Table 1 were prepared by dry blending the ingredients in a polyethylene bag and subsequently melt blending at 210° to 230° C. in a 28 or 53 mm Werner & Pfleiderer TM twin screw extruder with a vacuum port. Each of the blends, listed in the Table, also contained about 0.10 weight percent Irganox TM 1010 hindered polyphenol stabilizer (not separately reported in the Table). For the extruded pellets, 0.3 weight percent Kemamide TM W20 was also added.

The adhesive properties of the blends were evaluated by measuring the peel strength of laminates prepared using a sheet of the adhesive between two layers of PET film. The layers of PET film were 12 micrometers (0.48 mils) thick; heat seal conditions were 210° C., 0.8 seconds dwell time and 324 kPa (47 psig) applied pressure. Peel strength was measured by ASTM D 1876-72, modified in that the test was run at 305 mm/min, rather than 254 mm/min, and 3 to 6 duplicates of each sample were measured, rather than 10. The numbers are given as grams per 25 mm.

Comparative Examples C1 through C8 show poor peel strength because the acid polymer, which contains 0% vinyl acetate comonomer, is used with a base resin containing 28% vinyl acetate. This is greater than the 10% difference in comonomer content between the ethylene polymer and its acid-modified ethylene polymer permitted in the present invention. In contrast, Examples 1 through 4 show good results because the difference in comonomer content between the acid polymer and the base resin is less than 10%.

TABLE I

| Ex. | E Copol.[a] Type | % | Acid Copol.[b] Type | % | Tackifier Type[c] | % | Adhesive Thickness micrometers | % MAn in blend | Peel Str. g/25 mm |
|---|---|---|---|---|---|---|---|---|---|
| C1 | E/28VA | 80 | E/10iBa/10MAA | 10 | P90 | 10 | 41 | 0 | 663 |
| C2 | " | 75 | " | 10 | " | 15 | 36 | 0 | 590 |
| C3 | " | 85 | " | 10 | P115 | 5 | 33 | 0 | 368 |
| C4 | " | 80 | " | 10 | " | 10 | 33 | 0 | 445 |
| C5 | " | 75 | " | 10 | " | 15 | 33 | 0 | 595 |
| C6 | " | 80 | " | 5 | " | 15 | 38 | 0 | 613 |
| C7 | " | 65 | " | 20 | " | 15 | 38 | 0 | 390 |
| C8 | " | 55 | " | 30 | " | 15 | 41 | 0 | 268 |
| 1 | " | 75 | E/28VA-g-1.5MAn | 10 | " | 15 | 38 | 0.15 | 1239 |
| 2 | " | 65 | " | 20 | " | 15 | 30 | 0.30 | 1262 |
| 3 | " | 35 | " | 50 | " | 15 | 30 | 0.75 | 1430 |

TABLE I-continued

| Ex. | E Copol.[a] Type | % | Acid Copol.[b] Type | % | Tackifier Type[c] | % | Adhesive Thickness micrometers | % MAn in blend | Peel Str. g/25 mm |
|---|---|---|---|---|---|---|---|---|---|
| 4 | " | 65 | " | 20 | P90 | 15 | 43 | 0.30 | 1330 |

[a] E/28VA is a copolymer of ethylene with 28 weight percent vinyl acetate, melt index 6 dg/min.

[b] Acid copolymer is either a terpolymer of ethylene with 10 weight percent isobutyl acrylate and 10 weight percent methacrylic acid, melt index 10 dg/min, or a copolymer of ethylene with 28 weight percent vinyl acetate, grafted with 1.5 weight percent maleic anhydride, melt index 2.0 dg/min.

[c] P90 is Arkon P90, 100% hydrogenated C9 hydrocarbon resin, from Arakawa Chemical, having a Ring and Ball softening point ("R&B") of 90° C. P115 is a similar material, R&B 115° C.

The laminates in Table 2 were made in the same manner as in Table 1. Comparative Examples C9 and C10 are to be compared with Example 5. In comparative Example C9, a low peel number is observed because no acid polymer is employed. In Comparative Example C10, the comonomer difference between the acid polymer and base resin polymer is greater than 10%. Comparative Example C11, which contains no tackifier resin, compares unfavorably to Example 16 which is identical in composition with the exception of the tackifier. Examples 15, 16, and 17 show that blends of otherwise identical or compatible copolymers of different melt indices can be used in place of a single copolymer.

The laminates in Table 3 were prepared in the same manner as described for the Examples in Table 1. Comparative Examples C12 and C15 show poor results because the acrylate comonomer at 10% and vinyl ester comonomer at 9% respectively fall below the range of the present invention, i.e., 20 to 50 weight percent. Comparative Examples C13 and C14 give low peel numbers compared to Example 18 because the difference in comonomer content between acid-containing polymer and the base polymers is greater than 10%.

TABLE II[a]

| Ex. | E Copol. Type | % | High m.i. Copolymer Type | % | Acid Copol. Type | % | Tackifier Type | % | Adhesive Thickness micrometers | % MAn in blend | Peel Str. g/25 mm |
|---|---|---|---|---|---|---|---|---|---|---|---|
| C9 | E/28VA | 85 | (none) | | (none) | | P115 | 15 | 31 | 0 | 445 |
| C10 | " | 70 | " | | E/10iBA/10MAA | 15 | P115 | 15 | 20 | 0 | 516 |
| 5 | " | 80 | " | | E/28VA-g-1.5MAn | 5 | P115 | 15 | 31 | 0.075 | 2298 |
| 6 | " | 65 | " | | " | 20 | P90 | 15 | 18 | 0.3 | 1226 |
| 7 | " | 65 | " | | " | 20 | P125 | 15 | 20 | 0.3 | 1612 |
| 8 | " | 65 | " | | " | 20 | P140 | 15 | 23 | 0.3 | 1907 |
| 9 | " | 65 | " | | " | 20 | F-105 | 15 | 20 | 0.3 | 1339 |
| 10 | " | 65 | " | | " | 20 | R3102 | 15 | 25 | 0.3 | 1657 |
| 11 | " | 65 | " | | " | 20 | R6108 | 15 | 25 | 0.3 | 1725 |
| 12 | " | 65 | " | | " | 20 | R1126 | 15 | 25 | 0.3 | 1782 |
| 13 | " | 65 | " | | " | 20 | M115 | 15 | 25 | 0.3 | 1589 |
| 14 | " | 65 | " | | " | 20 | M135 | 15 | 30 | 0.3 | 1930 |
| 15 | " | 55 | E/28VA' | 10 | " | 20 | P115 | 15 | 25 | 0.3 | 1781 |
| C11 | " | 60 | " | 20 | " | 20 | (none) | 0 | 23 | 0.3 | 1793 |
| 16 | " | 45 | " | 20 | " | 20 | P115 | 15 | 30 | 0.3 | 2382 |
| 17 | " | 45 | " | 20 | " | 20 | F-105 | 15 | 18 | 0.3 | 1532 |

[a] Additional materials not identified in Table I:

E/28VA', in the second column, is identical to the first E/28VA except that its melt index is 25 dg/min.

P125 is Arkon ™ P125 100% hydrogenated C9 hydrocarbon resin, R&B 125° C.

P140 is a comparable material, R&B 140° C.

M115 is Arkon ™ M115 85% hydrogenated C9 hydrocarbon resin, R&B 115° C.

M135 is a comparable material, R&B 135° C.

F-105 is Floral ™ 105 65% hydrogenated rosin ester from Hercules, R&B 104° C.

R3102 is Regalrez ™ 3102, 30% hydrogenated hydrocarbon resin from Hercules, R&B 102° C. R6108, a comparable resin, is 60% hydrogenated, R&B 108° C. R1126 is 100% hydrogenated, R&B 126° C.

TABLE III[a]

| Ex. | E Copol. Type | % | High m.i. Copolymer Type | % | Acid Copol. Type | % | Tackifier Type | % | Adhesive Thickness micrometers | % MAn in blend | Peel Str. g/25 mm |
|---|---|---|---|---|---|---|---|---|---|---|---|
| C12 | (none) | | (none) | | E/10iBA/10MAA | 100 | (none) | | 36 | 0 | 227 |
| C13 | E/28VA | 50 | E/28VA' | 15 | EPDM-g-2MAn | 20 | P115 | 15 | 33 | 0.4 | 894 |
| C14 | " | 50 | " | 15 | E/9VA-g-1.5MAn | 20 | " | 15 | 41 | 0.3 | 477 |
| C15 | E/9VA | 65 | (none) | | " | 20 | " | 15 | 38 | 0.3 | 513 |
| 18 | E/28VA | 35 | E/28VA' | 30 | E/28VA-g-1.5MAn | 20 | " | 15 | 33 | 0.3 | 1285 |
| 19 | " | 15 | " | 50 | " | 20 | " | 15 | 38 | 0.3 | 1407 |
| 20 | " | | E/28VA" | 45 20 | " | 20 | " | 15 | 38 | 0.3 | 1476 |
| 21 | E/20MA | 65 | (none) | | E/20MA-g-1.5MAn | 20 | " | 15 | 43 | 0.3 | 1022 |
| C16 | (none) | | " | | E/21MA/4EHM | 85 | " | 15 | 43 | 0 | 1112 |
| 22 | E/30nBA/10CO | 75 | " | | E/nBA/CO-g-MAn | 10 | " | 15 | 51 | 0.03 | 1249 |

TABLE III[a-continued]

| Ex. | E Copol. Type | % | High m.i. Copolymer Type | % | Acid Copol. Type | % | Tackifier Type | % | Adhesive Thickness micrometers | % MAn in blend | Peel Str. g/25 mm |
|---|---|---|---|---|---|---|---|---|---|---|---|
| 23 | " | 75 | " | | " | | 10 | F-105 | 15 | 51 | 0.03 | 831 |

[a]Additional materials not identified in previous Tables:
EPDM-g-2MAn - ethylene propylene diene rubber grafted with 2% maleic anhydride
E/9VA - ethylene/9% vinyl acetate copolymer, melt index 7
E/9VA-g-1.5MAn - ethylene/9% vinyl acetate copolymer, melt index 1.2, grafted with 1.5 weight percent maleic anhydride
E/28VA" - ethylene/28% vinyl acetate copolymer, melt index 43
E/20MA - ethylene/20% methyl acrylate copolymer, melt index 2
E/20MA-g-1.5MAn - ethylene/20% methyl acrylate copolymer, melt index 3.6, grafted with 1.5 weight percent maleic anhydride
E/21MA/4EHM - ethylene/21% methyl acrylate/4% ethyl hydrogen maleate terpolymer
E/30nBA/10CO - ethylene/30% n-butyl acrylate/10% CO terpolymer, melt index 5
E/nBA/CO-g-MAn - ethylene/30% n-butyl acrylate/10% CO terpolymer, melt index 4.7, grafted with 0.3 weight percent maleic anhydride In Table 4, the multiple layer structures were made by coextrusion coating a layer of ionomer (ethylene methacrylic acid copolymer containing 15% methacrylic acid moieties, melt index 10 dg/min, 22% neutralized with zinc ions), 23 micrometers thick, and a layer of adhesive onto corona-treated PET film, 12 micrometers thick. The adhesive blends were melted in a 63 mm extruder with barrel temperatures from 154° C. at the rear to 232° C. at the front. The ionomer resin was melted in a 114 mm extruder with barrel temperatures from 177° C. in the rear to 232° C. at the front. Both melt streams were fed into a 107 cm (42 inch) die set at 232° C. The air gap was set at 16.5 centimeters. Line speed was 122 meters per minute.

Comparative Examples C17, C18, C22, C24 and C25 give poor results because the difference in vinyl ester comonomer content between the acid-containing polymer and the base polymer is greater than 10%. Comparative Example C19 compares unfavorably with Example 28 because it contains no tackifier. In Comparative Example C20, the acrylate comonomer content of the ethylene polymer is below 20 weight percent. Comparative Examples C21, C23 and C26 contain no acid polymers.

Table 4. The adhesive blends were melted in a 63 mm extruder with barrel temperatures from 154° C. at the rear to 232° C. at the front. The ionomer resin was melted in a 114 mm extruder with barrel temperatures from 177° C. in the rear to 232° C. at the front. The ethylene vinyl alcohol resin was melted in a 62.5 mm extruder with barrel temperatures from 177° C. in the rear to 232°0 C. at the front. The melt streams were fed into a feedblock in which the adhesive stream was split into two. The 1067 mm die was at 232° C. The air gap Was set at 16.5 centimeters. Line speed was 122 meters per minute. Good adhesive strength is achieved in the structure.

The multiple layer structures of Examples 33-39 were made with several different substrates. The adhesive blends were melted in a 87.5 mm extruder with barrel temperatures from 180° C. in the rear to 240° C. at the front. The ionomer and acid copolymer resins were melted in a 62.5 mm extruder with a similar temperature profile. The melt streams were were fed into a die with a slot width of 800 mm. The die was set at 240° C. The air gap was at 15 centimeters. Good bond strengths are obtained with different substrates.

The multiple layer structures of Examples 40-49

TABLE IV

| Ex. | E Copol.[b] % | High m.i. Copol.[c] % | Acid Copol. Type | % | Tackifier Type | % | Adhesive Thickness μm | % MAn in blend | Peel. Str., g/25 mm green[d] | 1 wk | 4 wk |
|---|---|---|---|---|---|---|---|---|---|---|---|
| C17 | 46 | 46 | E/15MAA[a] | 8 | (none) | | 18 | 0 | 423 | 319 | 454 |
| C18 | 80 | 0 | E/10iBA/10MAA | 20 | " | | 10.2 | 0 | 347 | 245 | 293 |
| C19 | 90 | 0 | E/28VA-g-1.5MAn | 10 | " | | 8 | 0.15 | 276 | 416 | — |
| C20 | 0 | 0 | E/10iBA/10MAA | 100 | " | | 9 | 0 | 133 | 142 | — |
| C21 | 95 | 0 | (none) | 0 | F-105 | 5 | 23 | 0 | 428 | 251 | 307 |
| C22 | 75 | 0 | E/10iBA/10MAA | 20 | P115 | 5 | 28 | 0 | 414 | 378 | 547 |
| 24 | 55 | 0 | E/28VA-g-1.5MAn | 40 | R6108 | 5 | 20 | 0.60 | 450 | 717 | 767 |
| 25 | 60 | 15 | " | 20 | " | 5 | 20 | 0.30 | 512 | 698 | 763 |
| 26 | 40 | 15 | " | 30 | P125 | 5 | 23 | 0.45 | 563 | 681 | 960 |
| C23 | 80 | 15 | (none) | 0 | R3102 | 5 | 18 | 0 | 470 | 456 | 689 |
| C24 | 60 | 15 | E/10iBA/10MAA | 10 | P90 | 15 | 15 | 0 | 510 | 454 | 452 |
| C25 | 50 | 15 | " | 20 | F-105 | 15 | 15 | 0 | 731 | 408 | 611 |
| 27 | 30 | 15 | E/28VA-g-1.5MAn | 40 | P115 | 15 | 10 | 0.60 | 557 | 744 | 875 |
| C26 | 85 | 0 | (none) | 0 | R6108 | 15 | 18 | 0 | 583 | 559 | 824 |
| C27 | 65 | 0 | E/10iBA/10MAA | 20 | P90 | 15 | 10 | 0 | 509 | 394 | 463 |
| 28 | 55 | 0 | E/28VA-g-1.5MAn | 20 | R3102 | 15 | 8 | 0.30 | 580 | 787 | 1076 |
| 29 | 45 | 0 | " | 40 | P125 | 15 | 10 | 0.60 | 590 | 695 | 792 |
| 30 | 45 | 0 | " | 40 | " | 15 | 8 | 0.60 | 583 | 607 | 838 |

[a]Ethylene/15 wt. % methacrylic acid copolymer, melt index 10.
[b]In each case the polymer was E/28VA, melt index 6.
[c]In each case the polymer was E/28VA, melt index 25.
[d]"Green" refers to peel testing conducted as soon as the test sample was made. "1 wk" and "4 wk" refer to peel testing conducted 1 week and 4 weeks respectively after sample manufacture.

In Table 5, the multiple layer structures of Examples 31 and 32 were made by coextrusion coating a layer of ionomer (as described for the Examples of Table 4), adhesive, a layer of ethylene vinyl alcohol copolymer containing 44 mol % ethylene, melt index 16, and adhesive onto PET film as described for the Examples of were prepared by coextrusion of an adhesive layer between a copolyester layer and an ethylene vinyl alcohol copolymer containing 30 mol % ethylene moieties. The copolyester was a high melt viscosity copolyester of ethylene glycol copolymerized with about 86% terephthalic and about 14% isophthalic acid, further containing 0.4% comonomer moieties derived from trimellitic acid. The adhesive blends were melted at 160° C in a 25 mm extruder at 4–6 rpm. The copolyester was fed through a 37.5 mm extruder at 30–45 rpm at 240° C. The extrudate was cast onto chill rolls maintained at 60° C. The takeup speed of the sheet was 1.5 m/min. Good bonding is achieved to copolyester and ethylene vinyl alcohol copolymer with these compositions.

TABLE V

| Ex. | Ethylene Copol.[a] % | High m.i. Copol.[b] % | Acid Copol.[c] % | Tackifier Type | % | Adhesive Thickness μm | % MAn in blend | Peel Str., g/25 mm green | 1 wk | 6 wk | Stucture[e] |
|---|---|---|---|---|---|---|---|---|---|---|---|
| 31 | 65 | 0 | 20 | R3102 | 15 | 7.6 | 0.3 | 583 | 674 | — | PET/A/EVOH1/A/IONOMER1 |
| 32 | 65 | 0 | 20 | R6108 | 15 | 5.1 | 0.3 | 574 | 686 | — | " |
| 33 | 50 | 15 | 20 | R3102 | 15 | 5 | 0.3 | — | 367 | 383 | PET/A/IONOMER2 |
| 34 | 50 | 15 | 20 | " | 15 | 10 | 0.3 | — | 567 | 633 | " |
| 35 | 50 | 15 | 20 | " | 15 | 5 | 0.3 | — | 450 | 483 | " |
| 36 | 50 | 15 | 20 | " | 15 | 10 | 0.3 | — | 717 | 783 | " |
| 37 | 50 | 15 | 20 | R6108 | 15 | 25 | 0.3 | — | d | d | PET/A/PET |
| 38 | 50 | 15 | 20 | R3102 | 15 | 5 | 0.3 | — | d | d | PET/A/AC/Al foil |
| 39 | 50 | 15 | 20 | " | 15 | 10 | 0.3 | — | d | d | " |
| 40 | 50 | 15 | 20 | P125 | 15 | 50 | 0.3 | — | — | 3230 | POLYESTER/A/EVOH2 |
| 41 | 45 | 0 | 40 | " | 15 | 65 | 0.6 | — | — | 3450 | " |
| 42 | 40 | 15 | 40 | " | 5 | 65 | 0.6 | — | — | 4722 | " |
| 43 | 50 | 15 | 20 | R3102 | 15 | 70 | 0.3 | — | — | 4859 | " |
| 44 | 65 | 0 | 20 | " | 15 | 55 | 0.3 | — | — | 4812 | " |
| 45 | 30 | 15 | 40 | " | 15 | 55 | 0.6 | — | — | 4722 | " |
| 46 | 50 | 15 | 20 | R3108 | 15 | 60 | 0.3 | — | — | 4812 | " |
| 47 | 60 | 15 | 20 | " | 5 | 60 | 0.3 | — | — | 1816 | " |
| 48 | 65 | 0 | 20 | " | 15 | 50 | 0.3 | — | — | 4903 | " |
| 49 | 55 | 0 | 40 | " | 15 | 55 | 0.6 | — | — | 5085 | " |

[a] E/28VA, mi 6
[b] E/28VA, mi 25
[c] E/28VA-g-1.5MAnh, mi 2.
[d] Could not separate.
[e] Multilayer structures as indicated, where A = adhesive layer (from this Table):
PET = polyethylene terephthalate film, 12 micrometers, corona treated
IONOMER1 = ethylene/15% methacrylic acid copolymer, 22% zinc neutralized, 25 micrometers
IONOMER2 = ethylene/8.7% methacrylic acid copolymer, 18% zinc neutralized, MI = 16, 25 μm
AC = ethylene/9% acrylic acid copolymer, melt index 10, 25 micrometers
Al foil = aluminum foil, 20 micrometers thick.
EVOH1 = ethylene vinyl alcohol copolymer, 44 mol % ethylene, MI = 16 8 micrometers
EVOH2 = ethylene vinyl alcohol copolymer, 30 mol % ethylene, MI = 3, 80-120 micrometers
POLYESTER = copolymer of iso-, terephthalic, and trimellitic acids, 185-405 micrometers

What is claimed is:

1. An extrudable bonding resin composition consisting essentially of:
   (a) about 65 to about 99 percent by weight of an ethylene copolymer portion consisting essentially of
      (i) about 1 to 100 percent by weight of a copolymer of about 50 to about 80 weight percent ethylene; about 20 to about 50 weight percent of at least one first comonomer copolymerized therewith selected from the group consisting of esters of unsaturated mono- or dicarboxylic acids of 2-20 carbon atoms, esters or salts of said unsaturated mono- or dicarboxylic acids, and vinyl esters of saturated carboxylic acids where the acid group has 1-18 carbon atoms; and second comonomer units selected from the group consisting of carboxylic acids, carboxylic acid anhydrides, half-esters of dicarboxylic acids, and salts of carboxylic acids, wherein the amount of said second comonomer units comprises about 0.03 to about 10 percent by weight of the total bonding resin composition, and
      (ii) 0 to about 99 percent by weight of at least one copolymer of about 50 to about 80 weight percent ethylene; about 20 to about 50 weight percent of at least one first comonomer copolymerized therewith selected form the group consisting of esters of unsaturated mono- or dicarboxylic acids of 2-20 carbon atoms esters or salts of said unsaturated mono-or dicarboxylic acids, and vinyl esters of saturated carboxylic acids where the acid group has 1-18 carbon atoms;
      wherein the copolymer of (i) and each copolymer of (ii) contain at least one said first copolymerized comonomer in common, the amount of each such common comonomer in each copolymer of (ii) being within about 10% of the amount of the corresponding comonomer in copolymer (i), and the total amount of said first copolymerized comonomers other than such common comonomers in any such copolymer being less than about 10%; and
   (b) about 1 to about 35 percent by weight of a tackifying resin.

2. The composition of claim 1 wherein the ethylene copolymer portion consists essentially of about 5 to about 50 weight percent copolymer of (i) and about 50 to about 95 weight percent of at least one copolymer of (ii).

3. The composition of claim 1 wherein the copolymer of (i) and each copolymer of (ii) contain the same copolymerized comonomers.

4. The composition of claim 3 wherein each comonomer in each copolymer of (ii) is within about 5 % of the amount of the corresponding comonomer in copolymer (i).

5. The composition of claim 1 wherein the amount of ethylene copolymer portion is about 80 to about 95 weight percent and amount of the tackifying resin is about 5 to about 20 weight percent.

6. The composition of claim 1 wherein the amount of each copolymerized comonomer in each of the copolymers of (i) and copolymer of (ii) is about 25 to about 30 percent by weight.

7. The composition of claim 1 wherein the copolymer of (i) exclusive of the grafted comonomer units and each copolymer of (ii) are selected from the group consisting of ethylene vinyl acetate copolymer, ethylene methyl acrylate copolymer, ethylene n-butyl acrylate copolymer, and ethylene n-butyl acrylate carbon monoxide copolymer.

8. The composition of claim 7 wherein the copolymer of (i) exclusive of the grafted comonomer units and each copolymer of (ii) are ethylene vinyl acetate copolymer.

9. The composition of claim 1 wherein the at least one copolymer of (ii) is a single copolymer.

10. The composition of claim 1 wherein the at least one copolymer of (ii) comprises two copolymers which differ in melt index.

11. The composition of claim 1 wherein the grafted comonomer units are grafted onto polymer (i) in an amount of about 0.05 to about 5 weight percent of polymer (i).

12. The composition of claim 11 wherein the grafted comonomer units are ethylenically unsaturated mono, di, or polycarboxylic acids, anhydrides, or salts.

13. The composition of claim 12 wherein the grafted comonomer units are acrylic acid, methacrylic acid, maleic acid, fumaric acid, itaconic acid, crotonic acid, itaconic anhydride, maleic anhydride, dimethyl maleic anhydride monosodium maleate, disodium maleate, diethyl fumarate, maleic anhydride or maleic acid.

14. The composition of claim 12 wherein the grafted comonomer units are anhydride units.

15. The composition of claim 14 wherein the anhydride is maleic anhydride.

16. The composition of claim 1 wherein the tackifying resin has a ring and ball softening point of about 0° to about 150° C. and is at least one of the resins selected from the group consisting of:
   (i) alicyclic or aliphatic hydrocarbon resins;
   (ii) aromatic hydrocarbon resins;
   (iii) rosin and rosin derivatives; and
   (iv) terpene resins.

17. The composition of claim 16 wherein the tackifying resin has a ring and ball softening point of about 75° to about 140° C.

18. The composition of claim 16 wherein the tackifying resin is a partially or fully hydrogenated hydrocarbon resin having a ring and ball softening temperature of about 100° to about 140° C.

19. The composition of claim 18 wherein the tackifying resin is an alicyclic resin prepared from monomers selected from the group consisting of alpha methyl styrene, vinyl toluene, and indene.

20. The composition of claim 16 wherein the tackifying resin is a partially hydrogentated alicyclic, aliphatic, or aromatic hydrocarbon resin.

21. The composition of claim 1 wherein copolymer (i) further contains 0 to about 30% by weight of copolymerized carbon monoxide and copolymer (ii) further contains 0 to about 30% by weight of copolymerized carbon monoxide, the amount of copolymerized carbon monoxide in (ii) being within about 10% of the amount in (i).

22. A multiple layer structure comprising at least one structural layer, at least one barrier layer, and at least one bonding layer of an extrudable bonding resin composition consisting essentially of
   (a) about 65 to about 99 percent by weight of an ethylene copolymer portion consisting essentially of
      (i) about 1 to 100 percent by weight of a copolymer of about 50 to about 80 weight percent ethylene and about 20 to about 50 weight percent of at least one comonomer copolymerized therewith selected from the group consisting of unsaturated mono- or dicarboxylic acids of 2-20 carbon atoms, esters or salts of said mono- or dicarboxylic acids, vinyl esters of saturated carboxylic acids where the acid group has 1-18 carbon atoms; and grafted comonomer units of pendant ethylenically unsaturated mono-, di-, or polycarboxylic acids, ethylenically unsaturated carboxylic acid anhydrides, or metal salts or half-esters of such acids or anhydrides, wherein the amount of said grafted comonomer units comprises about 0.03 to about 10 percent by weight of the total bonding resin composition, and
      (ii) 0 to 99 percent by weight of at least one copolymer of about 50 to about 80 weight percent ethylene and about 20 to about 50 weight percent of at least one comonomer copolymerized therewith selected from the group consisting of esters of unsaturated mono- or dicarboxylic acids of 2-20 carbon atoms, esters or salts of said unsaturated mono- or dicarboxylic acids, and vinyl esters of saturated carboxylic acids where the acid group had 1-18 carbon atoms,
   wherein the copolymer of (i) and each copolymer of (ii) contain at least one said copolymerized comonomer in common, the amount of each such common comonomer in each copolymer of (ii) being within about 10% of the amount of the corresponding comonomer in copolymer (i), and the total amount of said copolymerized comonomers other than such common comonomers in any such copolymer being less than about 10%; and
   (b) about 1 to about 35 percent by weight of a tackifying resin.

23. The multiple layer structure of claim 22 wherein the structural layer is polyester and the barrier layer is ethylene vinyl alcohol copolymer.

24. The multiple layer structure of claim 22 wherein the structural layer is is polyester and the barrier layer is aluminum.

25. The multiple layer structure of claim 22 comprising at least two structural layers.

26. The multiple layer structure of claim 25 wherein one structural layer is prepared from ionomer resin and one structural layer is prepared from polyester.

27. The multiple layer structure of claim 25 wherein one structural layer is prepared from acid copolymer and one structural layer is prepared from polyester.

28. The multiple layer structure of claim 27 wherein copolymer (i) further contains 0 to about 30% by weight of copolymerized carbon monoxide and copolymer (ii) further contains 0 to about 30% by weight of copolymerized carbon monoxide, the amount of copolymerized carbon monoxide in (ii) being within about 10% of the amount in (i).

* * * * *